United States Patent Office 3,272,699
Patented Sept. 13, 1966

3,272,699
N-(4-CHLOROPHENYLTHIOMETHYL)-ANILINE FUNGICIDES
Philip T. S. Lau, Rochester, and Gerald F. Grillot, Syracuse, N.Y., assignors to Allied Chemical Corporation, New York, N.Y., a corporation of New York
No Drawing. Filed May 22, 1964, Ser. No. 369,595
6 Claims. (Cl. 167—30)

This invention relates to fungicidal compositions and to a method of combatting fungus infestations therewith.

The invention is more particularly directed to fungicidal compositions containing as an essential active ingredient one or a mixture of N-(4-chlorophenylthiomethyl)-aniline compounds of the formula:

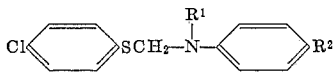

wherein $R^1$ is a member selected from the group consisting of hydrogen and

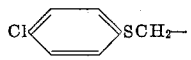

and $R^2$ is a member selected from the group consisting of $-NO_2$ and $-OCH_3$.

Our invention thus is directed to fungicidal compositions containing one or both of the following compounds as the active ingredient therein.

N - (4 - chlorophenylthiomethyl)-4-nitroaniline of the formula:

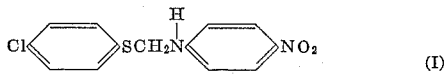

and N,N-bis(4-chlorophenylthiomethyl)-p-anisidine of the formula:

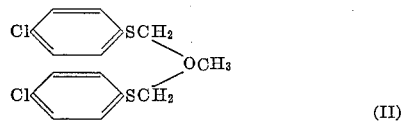

Of the above compounds, N,N-bis(4-chlorophenylthiomethyl-p-anisidine is a new composition of matter. It is a white crystalline solid, melting point 48–49° C.

The fungicidally active compounds of our invention can be prepared by condensing p-chlorothiophenol with formaldehyde and p-nitroaniline or p-anisidine respectively by refluxing in ethanol in either the presence or absence of acid according to the well-known Mannich reaction, viz.:

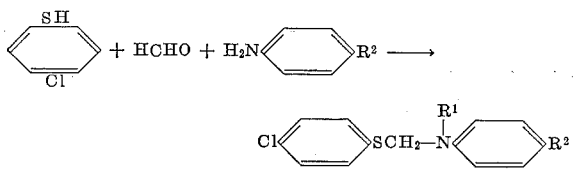

wherein the R substituents are as defined above. Thus condensation of equimolecular quantities of p-nitroaniline, formaldehyde and p-chlorothiophenol by heating in ethanol solution at 80° C. for about two hours results in the production of N-(4-chlorophenylthiomethyl)-4 nitroaniline which is a solid of melting point about 131–141° C., soluble in acetone, ligroin, ether and other common solvents. The N,N-bis(4-chlorophenylthiomethyl)-p-anisidine is prepared by heating two moles each of p-chlorothiophenol and formaldehyde with one mol of p-anisidine in a similar manner. The resulting N,N-bis(4-chlorophenylthiomethyl)-p-anisidine is a white solid, soluble in acetone and other common solvents melting point 48–49° C.

The fungicidal compositions of our invention are in the form of either solid or liquid dispersions of the fungicidally active compounds in inert carriers, usually together with a dispersing agent.

Plants which are to be treated for retarding and/or preventing fungus growths thereon are treated by spraying from liquid spray compositions or by spraying or dusting with dusts containing the active ingredients.

When in the form of a solid dispersion or dusting powder, the active fungicide is mixed with, for example 9 to 99 times its own weight of an inert diluent and usually a small amount of dispersant, all of the ingredients being in finely divided powder form as customarily used in dusting compounds for application to plants.

For the preparation of fungicidal dusting compositions, the finely divided N-(4-chlorophenylthiomethyl)-aniline compound is intimately mixed with finely divided dry solid talc, clays such as attapulgite, kaolin or fullers earth, wood flour or other inert solid carriers of the types commonly employed in formulating fungicidal powder compositions. Wettable powder formulations, suitable for dispersing in water and for applying the water dispersions to plants, are prepared by incorporating in any of these dusting compositions small amounts of ionic surface active materials, for example, about 1% to about 5% by weight which serve to maintain the finely powdered composition dispersed in water with which it is mixed. Suitable surface active materials are the anionic and cationic wetting, dispersing and emulsifying agents commonly used in the preparation of wettable powder compositions, for example, the alkali metal and ammonium salts of long chain aliphatic carboxylic acids, sulfonates of the aromatic or long chain aliphatic hydrocarbons such as sodium alkyl sulfates and sulfonates, alkyl aryl sulfonate salts, sulfonates of glycerides and their fatty acids and sulfonates of derivatives of fatty acid esters. In general, we prefer to employ the anionic surface active agents and to formulate the wettable powders containing the phenylthiomethyl aniline compound to include both wetting agent and dispersant or emulsifying agent which is common practice in preparing formulations to be dusted or sprayed onto living plants.

In preparing liquid spray compositions, the solid N-(4-chlorophenylthiomethyl)-aniline compound is dissolved in suitable organic solvents such as acetone, and this solution is dispersed in water. Concentrated solutions of the N-(4-chlorophenylthiomethyl)aniline compound in such water-soluble solvents may be prepared and dispersed in water to give an aqueous spray of suitable concentration for application to plants. In general, the aqueous dispersions which are applied to living plants will contain from about ¼ lb. to about 2 lbs., preferably from about ½ lb. to about 1 lb., of the phenylthiomethyl aniline compound for every 100 gallons of water.

The following specific examples further illustrate the invention.

*Examples 1 and 2*

One percent acetone solutions of N-(4-chlorophenylthiomethyl)-4-nitroaniline (Example 1) and N,N-bis(4-chlorophenylthiomethyl)-p-anisidine (Example 2) were prepared and portions thereof were diluted with water to provide solutions containing 100 parts per million, 10 parts per million and 1 part per million respectively, of the N-(4-chlorophenylthiomethyl)-aniline compound. These diluted solutions were tested in standard spore germination tests against spores of *Sclerotinia fructicola* (brown rot of stone fruits). The spores were produced by growing the fungus on potato dextrose agar for one week. The spores were taken up in an 0.5% sodium citrate solution which acts as a stimulant to spore germination. Portions of spore suspension were added to the N-(4-chlorophenylthiomethyl)-aniline compound solutions and the mixtures were placed on slides and incubated for 24 hours at 65° F. Comparable specimens of the spore suspensions in copper sulfate (as a standard fungicide) and tap water with no toxicant, were also prepared and incubated for comparative and check purposes respectively. The incubated solutions were then examined for spore germination with the results shown in Table I below.

TABLE I.—PERCENT SCLEROTINIA SPORE GERMINATION AT INDICATED CONCENTRATION OF TOXICANT IN PARTS PER MILLION

| Example No. | Parts per Million | | |
| --- | --- | --- | --- |
| | 100 | 10 | 1 |
| 1 | 1 | 95 | 98 |
| 2 | 0 | 99 | 98 |
| CuSO₄ | 0 | 91 | 97 |
| Check | 97 | | |

It will be noted from the table that N,N-bis(4-chlorophenylthiomethyl)-p-anisidine (Example 2) exerts complete control of the Sclerotinia fungus at a dosage of 100 parts per million and is equal in such control to the standard copper sulfate fungicide. The N-(4-chlorophenylthiomethyl)-4-nitroaniline (Example 1) exerts substantially complete control of the Sclerotinia at the 100 part per million dosage.

The pronounced fungicidal activity of N,N-bis(4-chlorophenylthiomethyl)-p-anisidine is quite surprising and unexpected since two closely related compounds of a similar character; namely, N,N-bis(4-chlorophenylthiomethyl)p-toluidine and N,N-bis(4-phenylthiomethyl)-4-chloroaniline are completely ineffective fungicides, permitting in the same test described above, germination of 92% and 100% respectively of the sclerotinia fungus at 100 parts per million concentration.

*Examples 3 and 4*

One percent acetone solutions of the two N-(4-chlorophenylthiomethyl)-aniline toxicants compounds of the invention were diluted with water to provide solutions containing ¼ lb. of toxicant per 100 gallons of water. These solutions were sprayed on the foliage of McIntosh apple seedlings and allowed to dry on the foliage. The plants were then inoculated with a spore suspension of *Venturia inaequalis* (apple scab), and held in an incubation chamber for 48 hours at 70° F. and approximately 100% humidity. The plants were returned to the greenhouse and held there for 14 days after which they were examined to note percent infected leaf area and spray injury to foliage, if any. Comparative test was run with a standard fungicide (Captan) and a check with no toxicant. Results of these tests are shown in Table II below.

TABLE II.—*VENTURIA INAEQUALIS* (APPLE SCAB)

| Example No. | Toxicant | Leaf Area, Percent Infected | Spray Injury |
| --- | --- | --- | --- |
| 3 | N-(4-chlorophenylthiomethyl)-4-nitroaniline | 22 | None. |
| 4 | N,N-bis(4-chlorophenylthiomethyl)-p-anisidine | 0 | Slight leaf curl. |
| | Captan* | 0 | None. |
| Check | None | 60 | Do. |

*N-trichloromethylmercapto-4-cyclohexene-1,2-dicarboximide.

It will be noted from the table that N,N-bis(4-chlorophenylthiomethyl)-p-anisidine provided complete control of apple scab in the above test with only slight spray injury and was as effective in its control as the standard fungicide (Captan), in this respect. The N-(4-chlorophenylthiomethyl) 4-nitroaniline exhibited considerable control of the apple scab and caused no spray injury.

*Example 5*

A wettable powder was prepared by mixing 25 parts of N,N-bis(4-chlorophenylthiomethyl)-p-anisidine with 71.5 parts of attapulgite clay, 1.5 parts of a wetting and dispersing agent (N-methyl-N-oleoyl taurate) and 2.0 parts of sodium lignin sulfonate dispersant, and pulverizing the mixture to obtain a mixture of which 90–95% passed a 325 Tyler mesh screen.

The resulting wettable powder was dispersed in water in the ratio of 2 lbs. per 100 gallons of water. This aqueous dispersion was sprayed on apple seedlings until the foliage was well covered with fine droplets. The spray was allowed to dry and the plants were then inoculated with *Venturia inaequalis* (apple scab fungus) by spraying them with a standard spore suspension. The inoculated seedlings were held in an incubation chamber for 48 hours at 70° F. and about 100% humidity and then placed in a greenhouse until 14 days after the time of inoculation. Apple seedlings were similarly sprayed with a dispersion of 1 lb. per 100 gallons of a 50% wettable powder of the standard fungicide Captan, inoculated, incubated and held in the greenhouse. As a check, apple seedlings were inoculated and similarly treated except for omission of toxicant treatment.

Under the above conditions, appreciable diminution of apple scab conditions were obtained in seedlings treated with N,N-bis(4-chlorophenylthiomethyl)-p-anisidine composition which showed considerably less infection with the fungus in the leaves of the three seedlings treated. The three plants inoculated with apple scab but not protected by any fungicide showed infection on 60% of the leaf area of the plants treated.

While the above describes the preferred embodiments of our invention, it will be understood that departures can be made therefrom within the scope of the specification and claims.

We claim:

1. A compound, N,N-bis(4-chlorophenylthiomethyl)-p-anisidine of the formula:

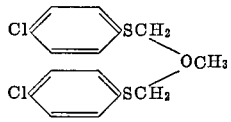

2. A fungicidal composition comprising a fungicidally effective concentration of N,N-bis(4-chlorophenylthiomethyl)-p-anisidine, together with a dispersing agent and an inert fungicidal adjuvant therefor.

3. A fungicidal composition comprising a fungicidally effective concentration of an N-(4-chlorophenylthiomethyl)-aniline compound of the formula:

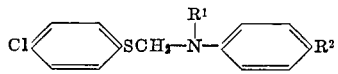

wherein $R^1$ is a member selected from the group consisting of hydrogen and

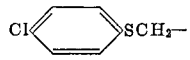

$R^2$ is a member selected from the group consisting of —NO₂ and —OCH₃, together with a dispersing agent and an inert fungicidal adjuvant therefor, said adjuvant comprising a finely divided inert solid.

4. The process for preventing and retarding fungus growth on living plants which comprises applying to said plants an aqueous dispersion of an N-(4-chlorophenylthiomethyl)-aniline of the formula:

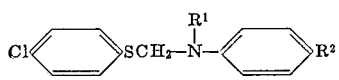

wherein $R^1$ is a member selected from the group consisting of hydrogen and

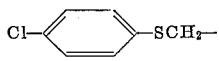

and $R^2$ is a member selected from the group consisting of —$NO_2$ and —$OCH_3$, in the proportions of between about ¼ pound and about 2 pounds of the N-(4-chlorophenylthiomethyl)-aniline compound per 100 gallons of water.

5. The process of claim 4 wherein the N-(4-chlorophenylthiomethyl)-aniline compound is N,N-bis(4-chlorophenylthiomethyl)-p-anisidine.

6. The process of claim 4 in which the plants are sprayed with an aqueous solution of a wettable powder consisting of said N-(4-chlorophenylthiomethyl)-aniline as the active fungicidal material mixed with between about 9 and about 99 times its weight of finely divided inert solid as carrier for the N-(4-chlorophenylthiomethyl)-aniline compound in said wettable powder, and between about 1% and about 5% by weight of the wettable powder, of a surface active ionic wetting agent, said aqueous dispersion containing between about ¼ pound and about 2 pounds of the N-(4-chlorophenylthiomethyl)-aniline compound for every 100 gallons of water.

References Cited by the Examiner
UNITED STATES PATENTS

| | | | |
|---|---|---|---|
| 2,426,576 | 8/1947 | Goulding | 260—571 |
| 2,642,373 | 6/1953 | Dazzi | 167—30 |
| 2,714,614 | 8/1955 | Weinmayr | 260—571 |
| 2,965,538 | 12/1960 | Weesner | 167—30 |

OTHER REFERENCES

Chemical Abstracts 54:5531d (1960).

JULIAN S. LEVITT, *Primary Examiner.*

JEROME D. GOLDBERG, *Assistant Examiner.*

UNITED STATES PATENT OFFICE
CERTIFICATE OF CORRECTION

Patent No. 3,272,699            September 13, 1966

Philip T. S. Lau et al.

It is hereby certified that error appears in the above numbered patent requiring correction and that the said Letters Patent should read as corrected below.

Column 1, lines 37 to 42 and column 4, lines 40 to 45, the formula, each occurrence, should appear as shown below instead of as in the patent:

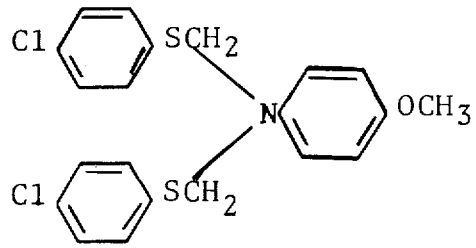

Signed and sealed this 29th day of August 1967.

(SEAL)
Attest:

ERNEST W. SWIDER            EDWARD J. BRENNER
Attesting Officer            Commissioner of Patents